(12) United States Patent
Lee et al.

(10) Patent No.: US 8,310,585 B2
(45) Date of Patent: Nov. 13, 2012

(54) RANGE FINDER AND METHOD FOR FINDING RANGE

(75) Inventors: Ki Min Lee, Seoul (KR); Jun Ki Lee, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 368 days.

(21) Appl. No.: 12/600,402

(22) PCT Filed: May 14, 2008

(86) PCT No.: PCT/KR2008/002681
§ 371 (c)(1), (2), (4) Date: Nov. 16, 2009

(87) PCT Pub. No.: WO2008/140253
PCT Pub. Date: Nov. 20, 2008

(65) Prior Publication Data
US 2010/0149407 A1  Jun. 17, 2010

(30) Foreign Application Priority Data

May 16, 2007  (KR) ........................ 10-2007-0047447
May 18, 2007  (KR) ........................ 10-2007-0048426
May 22, 2007  (KR) ........................ 10-2007-0049814

(51) Int. Cl.
*H04N 5/232* (2006.01)
*G01S 13/08* (2006.01)

(52) U.S. Cl. .......................... 348/348; 342/118; 342/128

(58) Field of Classification Search .................. None
See application file for complete search history.

(56) References Cited

U.S. PATENT DOCUMENTS

| 4,886,330 | A  |   | 12/1989 | Linick |
| 5,805,275 | A  | * | 9/1998  | Taylor ........................ 356/3.16 |
| 5,808,727 | A  |   | 9/1998  | Katayama |
| 2003/0235331 | A1 | * | 12/2003 | Kawaike et al. .............. 382/154 |
| 2005/0029458 | A1 | * | 2/2005  | Geng et al. .................... 250/347 |
| 2005/0105076 | A1 |   | 5/2005  | Jung et al. |
| 2005/0206872 | A1 | * | 9/2005  | Hua-Tang et al. .......... 356/4.01 |
| 2007/0236581 | A1 | * | 10/2007 | Uchiyama et al. ......... 348/222.1 |

(Continued)

FOREIGN PATENT DOCUMENTS

JP  55-147369 A  11/1980

(Continued)

OTHER PUBLICATIONS

European Search Report dated Oct. 4, 2011 in European Application No. 08753477 filed May 14, 2008.

(Continued)

*Primary Examiner* — Lin Ye
*Assistant Examiner* — John H Morehead, III
(74) *Attorney, Agent, or Firm* — Saliwanchik, Lloyd & Eisenschenk

(57) ABSTRACT

Provided is a range finder. The range finder comprises a light-emitting unit, a light-receiving unit, a reflection mirror, an actuator, and a controller. The light-emitting unit emits a light pulse, and a light-receiving unit detects reflected light incident thereto. The reflection minor reflects the light pulse emitted from the light-emitting unit to a measurement space, and reflecting the reflected light reflected by an object in the measurement space so that the reflected light is incident to the light-receiving unit. The actuator allows the reflection minor to move. The controller obtains distance information from a signal detected by the light-receiving unit, and obtains location information from the actuator.

9 Claims, 10 Drawing Sheets

U.S. PATENT DOCUMENTS

| | | | |
|---|---|---|---|
| 2008/0027591 A1* | 1/2008 | Lenser et al. | 701/2 |
| 2008/0031610 A1* | 2/2008 | Border et al. | 396/89 |
| 2009/0073416 A1* | 3/2009 | Lee | 356/5.01 |

FOREIGN PATENT DOCUMENTS

| | | |
|---|---|---|
| JP | 59-171878 A | 9/1984 |
| JP | 07-244153 A | 9/1995 |
| JP | 2001-050723 A | 2/2001 |
| JP | 2004-067035 A | 3/2004 |
| KR | 100147146 B1 | 5/1998 |
| KR | 10-1998-0086174 A | 12/1998 |
| KR | 10-2006-0115242 | 11/2006 |

OTHER PUBLICATIONS

Office Action dated Dec. 20, 2011 in Japanese Application No. 2010-508297 filed May 14, 2008.

* cited by examiner

WITH ACCUMULATION FOR PREDETERMINED TIME | CONSTANT LOCATION IS REPEATEDLY MEASURED (MOVING VELOCITY OF OBJECT AT THE SAME LOCATION CAN BE CALCULATED)

RANGE FINDER AND METHOD FOR FINDING RANGE

CROSS-REFERENCE TO RELATED APPLICATION

This application is the U.S. national stage application of International Patent Application No. PCT/KR2008/002681, filed May 14, 2008, which claims priority to Korean Application Nos. 10-2007-0047447, filed May 16, 2007, 10-2007-0048426, filed May 18, 2007, and 10-2007-0049814, filed May 22, 2007, the disclosures of each of which are incorporated herein by reference in their entirety.

TECHNICAL FIELD

Embodiments disclose a range finder.

BACKGROUND ART

A range finder can be applied to various industrial fields.

For example, high performance space recognition technology is required to allow a robot to effectively perform a given job. The high performance space recognition technology can be accomplished through distance measurement using a laser light pulse.

Also, a range finder can be applied to a service robot for housework represented by a cleaning robot. The service robot for housework can realize high performance self-controlled driving through space recognition technology.

Also, the range finder can be applied to an automobile to realize traffic lane recognition, a sudden stop function with respect to a sudden appearance of a vehicle and a person, so that self-controlled driving of an automobile can be realized.

Also, the range finder can be applied to a security device to detect movement of an object according to change in a measured distance, so that whether an intruder exists can be judged.

DISCLOSURE OF INVENTION

Technical Problem

Embodiments provide a range finder.

Embodiments also provide a range finder measuring a distance to an object located in a three-dimensional (3D) measurement space to recognize a 3D space.

Embodiments also provide a range finder that can effectively process distance measurement data regarding a 3D measurement space, and a method thereof.

Embodiments also provide a range finder including an actuator which allows the reflection minor to rotate in a first direction around a first axis and in a second direction around a second axis perpendicular to the first axis.

Embodiments also provide a range finder having an advantage in miniaturization.

Embodiments also provide a range finder that can change resolution to measure a distance with respect to an object located in a 3D measurement space, and a method thereof.

Embodiments also provide a range finder that can identify an object located in a 3D measurement space and extract the movement and moving velocity of the object, and a method thereof.

Technical Solution

In an embodiment, a range finder comprises: a light-emitting unit emitting a light pulse; a light-receiving unit detecting reflected light incident thereto; a reflection mirror reflecting the light pulse emitted from the light-emitting unit to a measurement space, and reflecting the reflected light reflected by an object in the measurement space so that the reflected light is incident to the light-receiving unit; an actuator allowing the reflection minor to move; and a controller obtaining distance information from a signal detected by the light-receiving unit, and obtaining location information from the actuator.

In an embodiment, a method for finding a range comprises: emitting a light pulse to a measurement space and detecting reflected incident light reflected by an object to obtain location information and distance information of the object; and varying a direction in which the light pulse is emitted to obtain location information and distance information of the object.

In an embodiment, a method for finding a range comprises: emitting a light pulse to a measurement space and detecting reflected incident light reflected by an object to obtain location information and distance information of the object; mapping the location information to new location information; and measuring a distance of the object using the new location information and the distance information.

The details of one or more embodiments are set forth in the accompanying drawings and the description below. Other features will be apparent from the description and drawings, and from the claims.

Advantageous Effects

Embodiments can provide a range finder that can measure a distance to an object in a 3D space and recognize a space.

Embodiments also can provide a range finder that can effectively process location information and distance information of an object existing in a 3D space, and a method thereof.

Embodiments also can provide a range finder including an actuator which allows the reflection minor to rotate in a first direction around a first axis and in a second direction around a second axis perpendicular to the first axis.

Embodiments also can provide a range finder having an advantage in miniaturization.

Embodiments also can provide a range finder that can change resolution to measure a distance with respect to an object located in a 3D measurement space, and a method thereof.

Embodiments also can provide a range finder that can identify an object located in a 3D measurement space and extract the movement and moving velocity of the object, and a method thereof.

MODE FOR THE INVENTION

Reference will now be made in detail to the embodiments of the present disclosure, examples of which are illustrated in the accompanying drawings.

Figure 1:
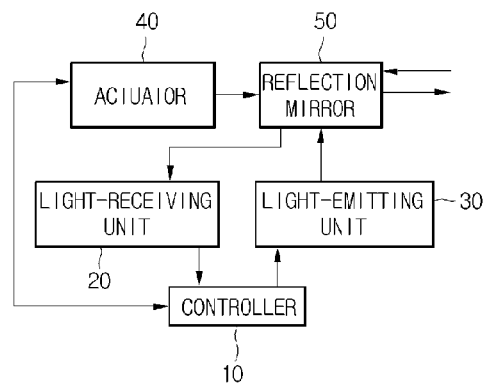
FIG. 1 is a view explaining a range finder according to an embodiment.

FIG. 1 is a view explaining a range finder according to an embodiment.

Referring to FIG. 1, the range finder includes a controller 10, a light-receiving unit 20, a light-emitting unit 30, an actuator 40, and a reflection minor 50.

The controller 10 drives the actuator 40 and obtains information of a direction in which a light pulse has been emitted from the actuator 40, i.e., location information of the light pulse.

Also, the controller 10 allows the light pulse to be emitted from the light-emitting unit 30, and directly transmits distance information and location information obtained through the light-receiving unit 20 and the actuator 40 to an external device, or processing the information to transmit the same to the external device.

The light-emitting unit 30 includes a light emitting device such as a pulse laser diode, and emits a light pulse under control of the controller 10.

The light-receiving unit 20 includes a light receiving device for detecting light such as a photodiode. The light-receiving unit 20 can be an avalanche photodiode including an amplification circuit therein to detect minute light.

The reflection mirror 50 reflects a light pulse emitted from the light-emitting unit 30 to a measurement space, and allows returning light reflected by an object in the measurement space to be incident to the light-receiving unit 20.

The actuator 40 changes the angle of the reflection mirror 50 under control of the controller 10. The actuator 40 allows the reflection minor 50 to rotate in a first direction around a first axis, and allow the reflection mirror 50 to rotate in a second direction around a second axis perpendicular to the first axis.

For example, the actuator 40 can drive the reflection minor 50 such that the reflection minor 50 rotates in the first direction by 360 degrees around the first axis and rotates in the second direction within a range of ±10 degrees around the second axis.

Also, the actuator 40 can drive the reflection mirror 50 such that the reflection mirror 50 rotates by 180 degrees around the first axis, or rotates within a range of ±90 degrees around the second axis.

Also, the actuator 40 can drive the reflection mirror 50 such that the reflection mirror 50 rotates in different rotational velocity and angle range around the first and second axes, and change the frequency of a light pulse depending on an operating mode.

In the case where a light pulse emitted from the light-emitting unit 30 is reflected by an object in a measurement space and incident to the light-receiving unit 20, the range finder according to the embodiment measures a distance to the object in the measurement space from the range finder with consideration of the flying time and the velocity of the light pulse.

Since the range finder according to the embodiment measures a distance while the reflection minor 50 rotates around the first and second axes as the actuator 40 operates, it can measure a distance of an object located in a 3D space. That is, the range finder can realize 3D space recognition technology.

Meanwhile, the range finder according to the embodiment can measure a distance of an object located in a measurement space with varied resolution of the measurement space. The controller 10 can increase the frequency of a light pulse emitted from the light-emitting unit 30 in order to increase resolution.

Also, the range finder according to the embodiment controls the driving of the actuator 40 to change the angle range or rotational velocity in which the reflection mirror 50 rotates around the first and second axes even without changing the frequency of the light pulse, thereby changing the resolution of the horizontal direction or the vertical direction.

Also, the range finder according to the embodiment can operate in a first operating mode and a second operating mode under control of the controller 10 or an external device connected to the controller 10.

The first operating mode is a long distance measurement mode suitable for the case of measuring a distance of an object located at a long distance. The second operating mode is a short distance measurement mode suitable for measuring a distance of an object located at a short distance.

In the case where the range finder operates in the long distance measurement mode, the controller 10 decreases a velocity with which the reflection mirror 50 rotates in the first direction around the first axis, or decreases a velocity or a range in which the reflection minor 50 rotates in the second direction around the second axis. Also, the controller 10 can decrease the frequency of the light pulse.

On the other hand, in the case where the range finder operates in the short distance measurement mode, the controller 10 increases a velocity with which the reflection mirror 50 rotates in the first direction around the first axis, or increases a velocity or a range in which the reflection minor 50 rotates in the second direction around the second axis. Also, the controller 10 can increase the frequency of the light pulse.

Also, the range finder according to the embodiment can operate in a third operating mode and a fourth operating mode under control of the controller 10 or an external device connected to the controller 10.

The third operating mode is a precise measurement mode suitable for the case of precisely measuring an object located in a measurement space. The fourth operating mode is a movement measurement mode suitable for the case of measuring a relative movement of an object located in a measurement space.

In the case where the range finder operates in the precise measurement mode, the controller 10 asynchronizes periods by which the reflection mirror 50 rotates in the first direction and the second direction around the first axis and the second axis to allow a light pulse to be densely emitted over a measurement space.

On the other hand, in the case where the range finder operates in the movement measurement mode, the controller 10 synchronizes periods by which the reflection mirror 50 rotates in the first direction and the second direction around the first axis and the second axis to allow a light pulse to be emitted to the same location in a measurement space.

That is, in the precise measurement mode, light pulses are emitted to all possible areas in the measurement space to obtain distance information regarding the entire measurement space. In the movement measurement mode, a light pulse is emitted to only a constant space of the measurement space to obtain change in distance information of the constant space.

Location information and distance information obtained through the precise measurement mode and the movement measurement mode are combined or compared for each frame, so that precise measurement or movement of an object can be extracted.

FIGS. 2 to 5 are views explaining a range finder according to an embodiment.

Though the controller 10 described in FIG. 1 has not shown in FIGS. 2 to 5, the controller 10 can be realized in the form of a chip mounted in a circuit board electrically connected with the actuator 40, the light-receiving unit 20, and the light-emitting unit 30.

The range finder according to the embodiment can be divided into a rotating body 300, a fixing body 310, and a vertical moving body 320 for convenience in description.

Figure 2:
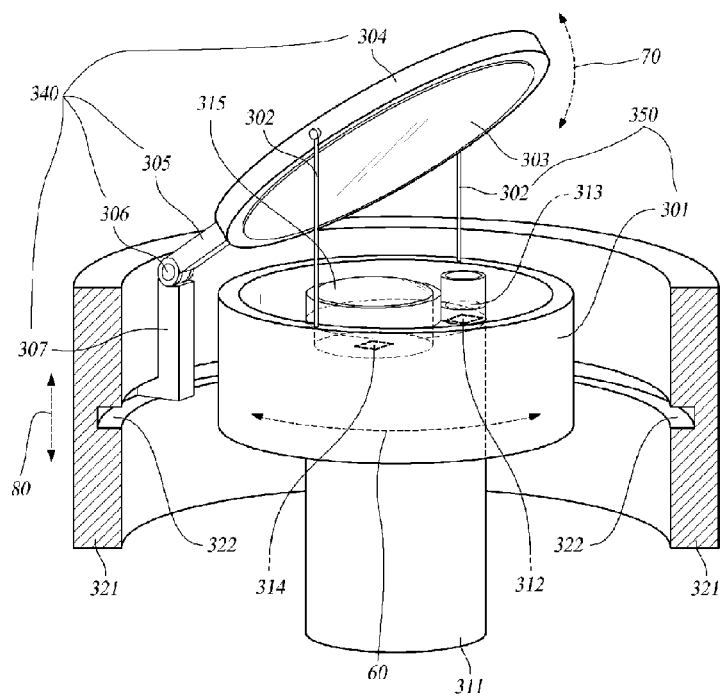
FIGS. 2 to 5 are views explaining a range finder according to an embodiment.
Figure 3:
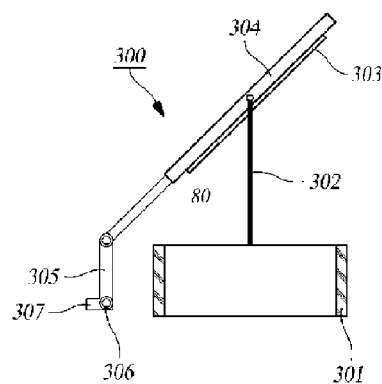

Referring to FIGS. 2 and 3, the rotating body 300 includes a minor 303, a mirror mount 340, and a rotating member 350.

The minor 303 is formed in a circular shape as a specific embodiment of the reflection minor 50 described in FIG. 1.

The minor 303 reflects a light pulse emitted from a light emitting device 312 to a measurement space, and reflects returning light reflected by an object in a measurement space to send the light to the light receiving device 314.

The minor mount 340 supports the minor 303 and allows the mirror 303 to a second direction 70 around a virtual horizontal axis.

The minor mount 340 includes a mirror mount plate 304, a connection shaft 305, a hinge 306, and a rotation guide shaft 307.

The minor mount plate 304 is realized in a plate supporting the mirror 303. The connection shaft 305 is coupled to the mirror mount plate 304 and is connected to the rotation guide shaft 307 through the hinge 306.

The rotation guide shaft 307 is inserted into a guide rail 322 formed in a circular groove in the inner surface of the vertical moving body 320 to rotate along the guide rail 322.

The rotating member 350 includes a ring-shaped rotation ring 301 connected with a motor to receive rotational force from the motor, and fixing shafts 302 fixed at the rotation ring 301 to support both sides of the mirror mount plate 304 so that the mirror mount plate 304 can vertically rotate.

The rotating member 350 allows the mirror mount plate 304 supporting the mirror 303 to rotate by 360 degrees around a virtual vertical axis.

Therefore, the minor 303 rotates in a first direction 60 as the rotating member 350 rotates. At this point, since the rotation guide shaft 307 connected to the mirror mount plate 304 moves along the guide rail 322, the mirror 303 can freely rotate in the first direction 60.

Also, since the vertical moving body 320 moves in a sliding manner along a third direction 80, i.e., a vertical direction, an angel between the connection shaft 305 and the rotation guide shaft 307 around the hinge 306 changes, so that the mirror mount plate 304 rotates in the second direction 70 around a virtual horizontal axis formed by the fixing shafts 302.

Therefore, the slope of the mirror 303 changes, so that a progression path of a light pulse emitted from the light emitting device 312 changes.

Figure 4:
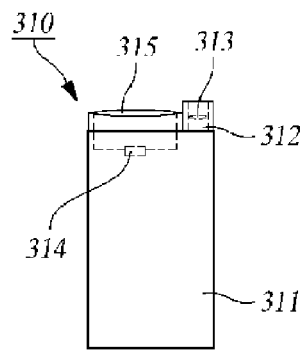

Referring to FIGS. 2 and 4, the fixing body 310 includes a base 311. The light-receiving unit 20 and the light-emitting unit 30 described in FIG. 1 are disposed on the base 311.

The light receiving device 314 sensing incident reflected light, and a condensing lens 315 condensing the reflected light to the light receiving device 314 as a specific embodiment of the light-receiving unit 20 are formed on the base 311.

Also, the light emitting device 312 emitting a light pulse in the form of a laser, and a collimator lens 313 changing light emitted from the light-emitting device 312 into parallel light as a specific embodiment of the light-emitting unit 30 are formed on the base 311.

A light pulse emitted from the light emitting device 312 is changed into parallel light through the collimator lens 313, and emitted to a measurement space by the mirror 303. At this point, the progression direction of the light pulse emitted from the light emitting device 312 changes depending on a degree by which the minor 303 rotates in the first direction 60 and a degree by which the mirror 303 rotates in the second direction 70.

Figure 5:
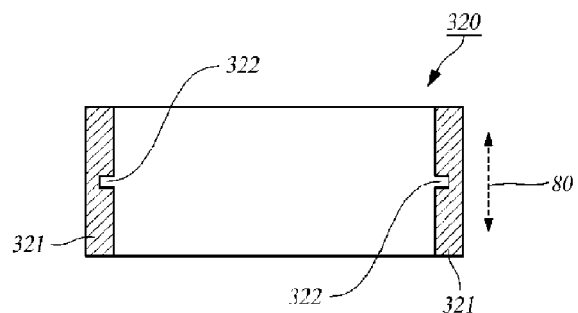

Referring to FIGS. 2 and 5, the vertical moving body 320 includes a cylindrical drum 321, the guide rail 322 formed in the circular groove in the inner surface of the drum 321, and a vertical driving member (not shown) allowing the drum 321 to slide in the third direction 80.

The rotation guide shaft 307 connecting to the mirror mount plate 304 is inserted into the guide rail 322.

The drum 321 moves in a vertical direction by an operation control of the vertical driving member. The vertical driving member can be realized in two types.

Figure 6:
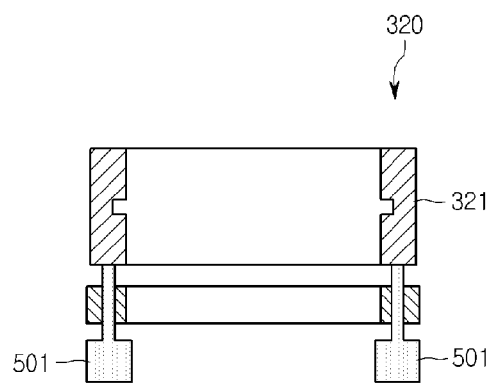
FIGS. 6 and 7 are views explaining an embodiment of a vertical driving member in a range finder according to an embodiment.
Figure 7:
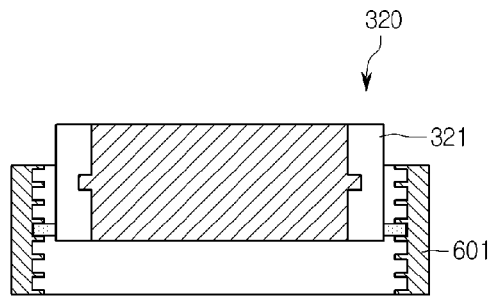

FIGS. 6 and 7 are views explaining an embodiment of the vertical driving member.

Referring to FIG. 6, the vertical driving member can be realized using a linear actuator 501.

The linear actuator 501 is provided under the vertical moving body 320 to move the drum 321 vertically.

The linear actuator 501 pushes upward or pulls downward the drum 321 using electromagnetic force or vacuum force to move the drum 321 vertically.

Referring to FIG. 7, the vertical driving member can be realized using a motor rotation shaft 601.

The motor rotation shaft 601 is disposed around the vertical moving body 320, and screw-shaped rails are formed in the inner surface of the motor rotation shaft 601 to allow the drum 321 of the vertical moving body 320 engaged with the screw-shaped rail to move vertically as the screw-shaped rail rotates.

As described above, the range finder according to the embodiment can measure a distance of an object located in a 3D space by allowing the mirror 303 to freely rotate in the first and second directions 60 and 70.

Figure 8:
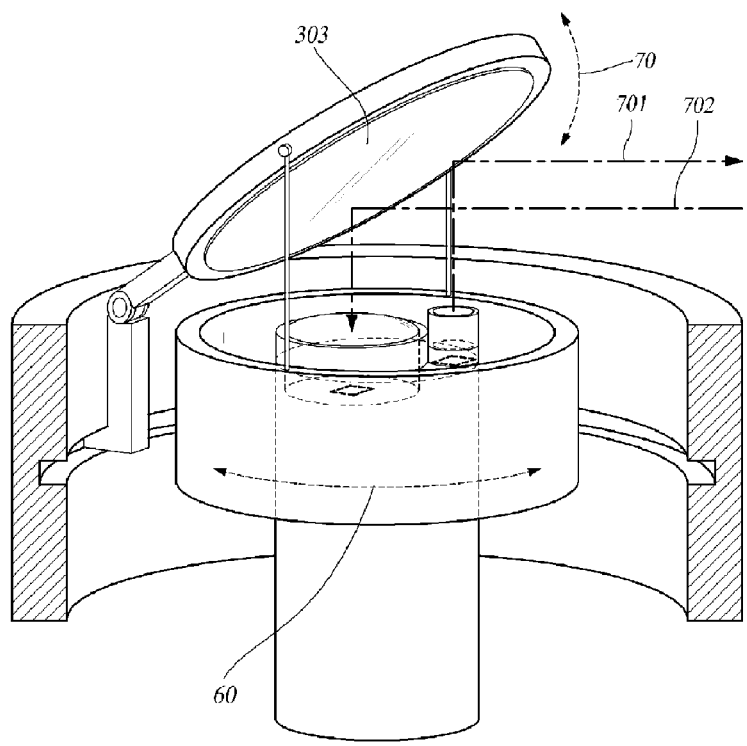
FIGS. 8 and 9 are views illustrating a mirror rotated in a first direction by 180 degree in a range finder according to an embodiment.
Figure 9:
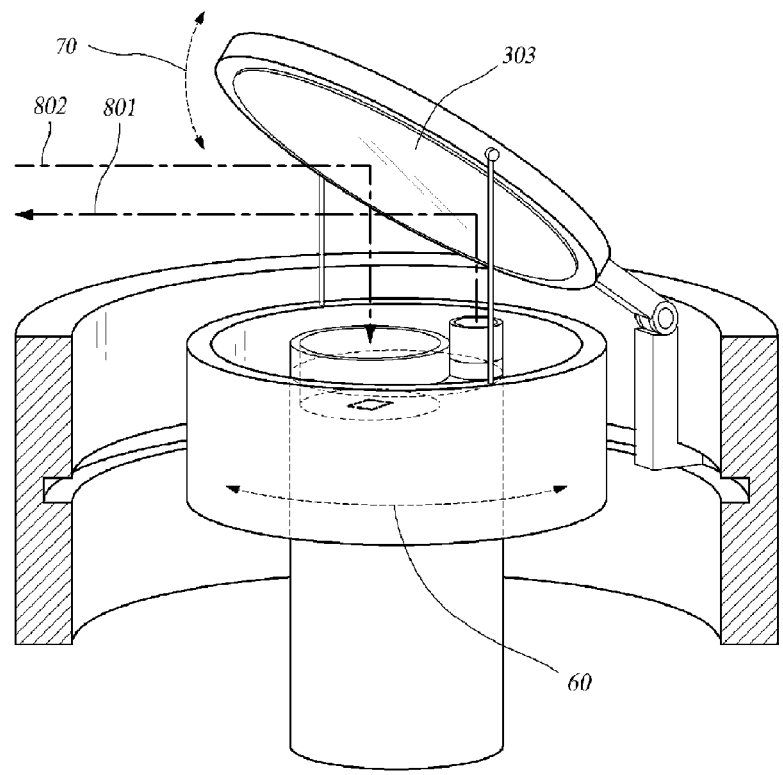

FIGS. 8 and 9 are views illustrating states before and after the minor 303 rotates in the first direction 60 by 180 degrees in the range finder according to the embodiment.

Referring to FIGS. 8 and 9, a light pulse 701 emitted from the light emitting device 312 is emitted to the right direction through the minor 303, and reflected light 702 incident from the right direction returns to the light-receiving device through the minor 303.

On the other hand, in the case where the mirror 303 rotates in the first direction 60 by 180 degrees, a light pulse 801 emitted from the light emitting device 312 is emitted to the left direction through the mirror 303, and reflected light 802 incident from the left direction returns to the light receiving device 314 through the mirror 303.

Though the mirror 303 can rotate in the first direction 60 by 360 degrees according to the embodiment, a range and a rotation velocity in which the mirror 303 rotates in the first direction 60 can be variously designed depending on a product to which the range finder is applied.

Also, even in the case where the range finder is applied to the same products, the rotation range and the rotation velocity can be varied depending on the operating mode of the range finder.

Figure 10:
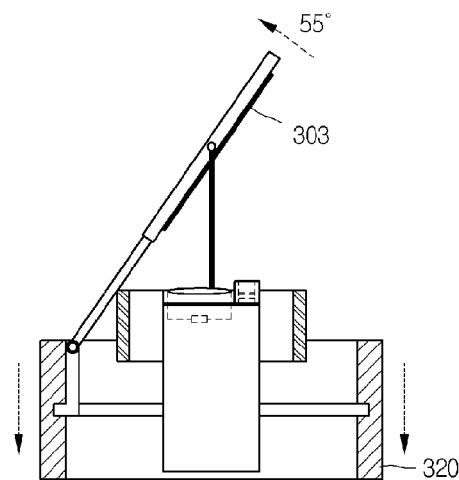
FIGS. 10 to 12 are views illustrating a minor rotated in a second direction in a range finder according to an embodiment.
Figure 11:
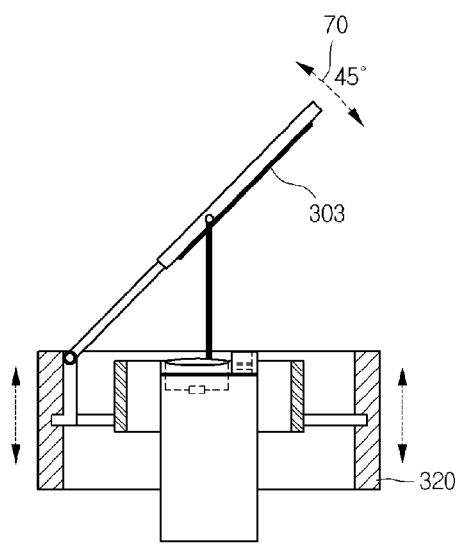
Figure 12:
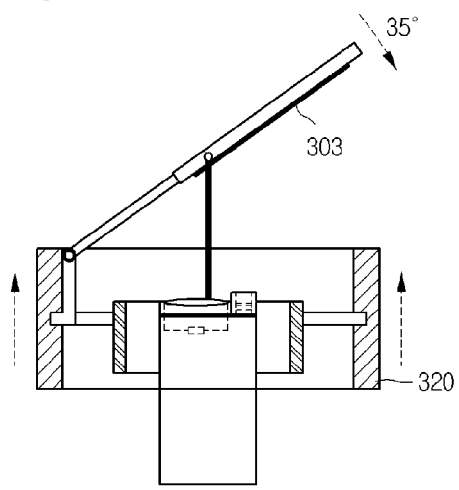

FIGS. 10 to 12 are views the minor 303 having rotated in the second direction 70 in the range finder according to an embodiment.

The minor 303 has a slope of 35 to 55 degrees with respect to a horizontal plane as the vertical moving body 320 moves vertically.

As illustrated in FIG. 10, in the case where the vertical moving body 320 moves in the lower direction, the mirror 303 has a slope of 55 degrees with respect to the horizontal plane. As illustrated in FIG. 12, in the case where the vertical moving body 320 moves in the upper direction, the mirror 303 has a slope of 35 degrees with respect to the horizontal plane.

Though the mirror 303 rotates in the second direction 70 within the range of ±10 degrees in the embodiment, the range within which the minor 303 rotates in the second direction 70 can change depending on a design of a product to which the range finder is applied.

That is, though the minor 303 can rotate in the second direction 70 within the range of ±10 degrees in the embodiment, the rotation range and the rotation velocity in which the minor 303 rotates in the second direction 70 can be varied depending on a design of a product to which the range finder is applied.

Also, even in the case where the range finder is applied to the same products, the rotation range and the rotation velocity can be varied depending on the operating mode of the range finder.

For example, the range finder can rotate in the second direction 70 within the range of ±45 degrees from a slope of 45 degrees.

Also, in the case where the range finder operates in the long distance measurement mode, the controller 10 can decrease a velocity in which the reflection minor 50 rotates in the second direction 70 or limit a range within which the reflection minor 50 rotates in the second direction 70 to ±5 degrees.

Also, in the case where the range finder operates in the short distance measurement mode, the controller 10 can increase a velocity in which the reflection mirror 50 rotates in the second direction 70 or increase a range within which the reflection minor 50 rotates in the second direction 70 to ±15 degrees.

Also, in the case where the range finder operates in the precise measurement mode, the controller 10 can asynchronize periods by which the reflection mirror 50 rotates in the first direction 60 and the second direction 70. In the case where the range finder operates in the movement measurement mode, the controller 10 can synchronize periods by which the reflection minor 50 rotates in the first direction 60 and the second direction 70.

The range finder according to an embodiment allows the minor 303 to rotate in the first direction 60 and the second direction 70 in order to measure a distance of an object located in a 3D space.

The range finder according to an embodiment minimizes the number of parts driven in order to emit a light pulse from the light emitting device 312 to a 3D space, thereby simplifying driving of the actuator 40 and miniaturizing the actuator 40.

That is, the range finder according to the embodiment allows the mirror 303 to perform a relative motion with respect to the light emitting device 312 and the light receiving device 314, thereby miniaturizing the actuator 40.

Specifically, parts driven in order to emit a light pulse from the light emitting device 312 in the first direction 60 are the minor 303, the mirror mount 340, and the rotating member 350. Also, parts driven in order to emit a light pulse emitted from the light emitting device 312 in the second direction 70 are the minor 303, the mirror mount 340, and the vertical moving body 320.

Therefore, the embodiment can provide the range finder having a simple operation and a small size.

Particularly, the range finder according to the embodiment can change a velocity with which the mirror 303 rotates in the first direction 60 and the second direction 70 to order to change the resolution of the horizontal direction and the resolution of the vertical direction.

For this purpose, the controller 10 controls a velocity at which the rotating member 350 rotates in the first direction 60, or controls a velocity or a range in which the vertical moving body 320 moves in the vertical direction. At this point, the controller 10 can control the operation of a part to which a lowest load is applied.

Figure 13:
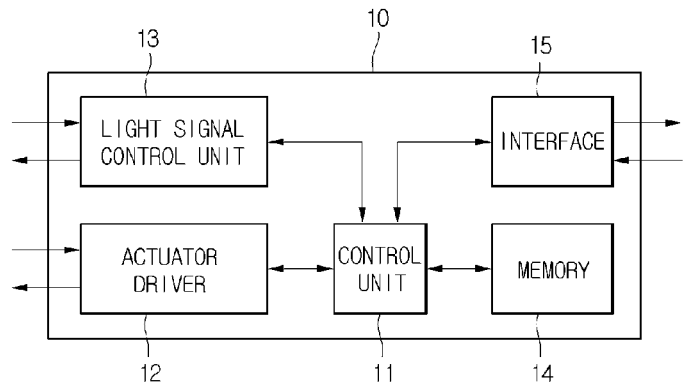
FIG. 13 is a view explaining a controller of a range finder according to an embodiment.

FIG. 13 is a view explaining the controller of the range finder according to the embodiment.

The controller 10 includes a control unit 11, an actuator driver 12, a light signal control unit 13, a memory 14, and an interface 15.

The actuator driver 12 applies a driving signal for rotating the mirror 303 in the first direction 60 and the second direction 70 in response to a control signal of the control unit 11. Also, the actuator driver 12 obtains the rotation state information of the mirror 303 to transmit the information to the control unit 11.

The rotation state information of the mirror 303 is used as location information of a direction in which the light pulse has been emitted.

For example, the rotation state information of the minor 303 can be obtained by attaching index marks to the rotation ring 301 and the drum 321 and installing a sensor detecting the index marks to judge a state in which the rotation ring 301 and the drum 321 move in the first direction 60 and the second direction 80.

The light signal controller 13 allows a light pulse to be emitted from the light-emitting unit 30 under control of the control unit 11, and converts a signal output from the light-receiving unit 20 into a digital signal to transmit the signal to the control unit 11.

The memory 14 stores distance information and location information obtained through the light-receiving unit 20.

The memory 14 can store distance information and location information of a measurement space for each frame, and can store information regarding a combination or a difference of distance information and location information of a plurality of frames.

The interface 15 is connected to an external device to allow distance information and location information obtained by the range finder to be transmitted to the external device, and transmits a control command to the control unit 11 when the control command is input from the external device.

Figure 14:
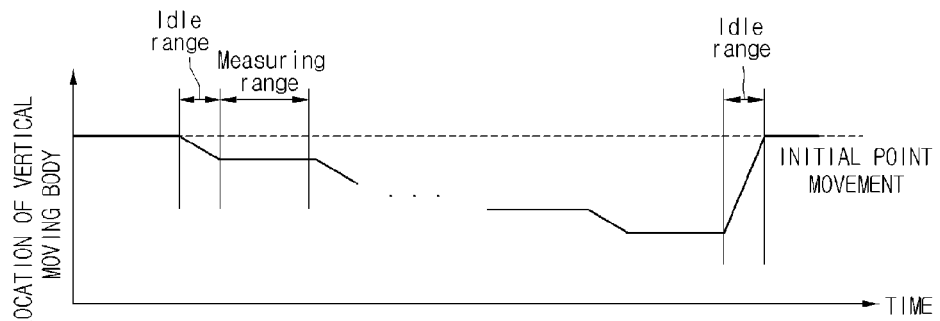
FIGS. 14 to 16 are views explaining a method for finding a range according to an embodiment.
Figure 15:
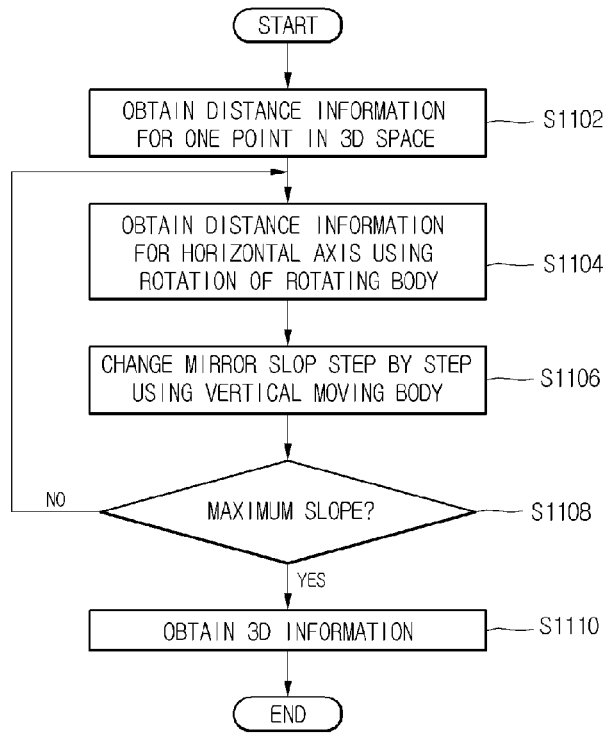
Figure 16:
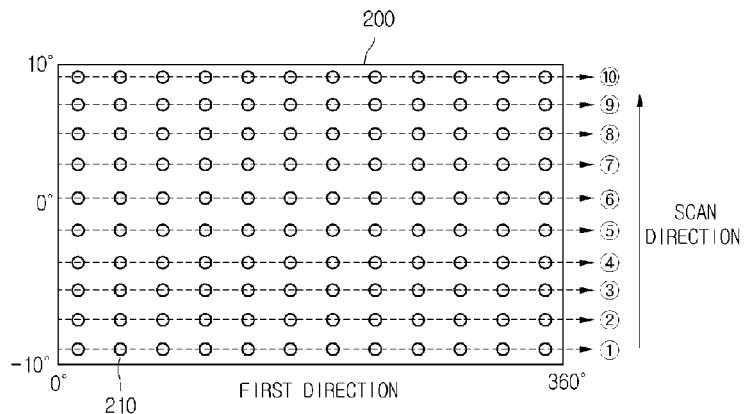

FIGS. 14 to 16 are views explaining a method for finding a range according to an embodiment.

FIG. 14 illustrates a distance measurement range for each vertical moving trace of the vertical moving body 320.

The vertical moving body 320 do not move during a measuring range, and moves downward during an idle range.

The minor 303 rotates in the second direction 70 depending on a distance by which the vertical moving body 320 moves in the vertical direction. In the embodiment, the mirror 303 rotates in the second direction 70 within the angle range of ±10 degrees.

During the measurement range, the mirror 303 rotates in the first direction 60. In the embodiment, the mirror 303 rotates in the first direction 60 within the angle range of 360 degrees.

FIG. 15 is a view explaining a method for finding a range according to an embodiment.

To measure a distance of an object existing in a measurement space, an operation of obtaining distance information of one point of the objects is performed (S1102).

Obtaining distance information of the one point is described. A light pulse is emitted from the light emitting device 312, and the collimating lens 313 changes the light-pulse into parallel light. The light pulse having reached the object is reflected by the surface of the object, and a portion of the light returns to a direction in which the range finder is located.

The reflected light is reflected by the mirror 303, and then passes through the condensing lens 315 and is condensed to the light receiving device 314. The light receiving device 314 senses a condensed signal and delivers the signal to the light signal control unit 13. Through the above process, distance information of one point in a measurement space is obtained.

After the distance information of the one point in the measurement space is obtained, the rotating body 300 is rotated to rotate the mirror 303 by 360 degrees, so that a distance of one line in a horizontal direction (S1104).

After the distance measurement of the one line is completed, the slope of the minor 303 is changed step by step using the vertical moving body 320 (S1106).

The operations S1104 and S1106 are performed by rotating the rotating body 300 while the location of the vertical moving body 320 is changed until the mirror 303 reaches a maximum or minimum slope (S1108).

Consequently, distance information of a 3D space can be obtained (S1110).

FIG. 16 illustrates a scanning method of a 3D space in a range finder according to an embodiment.

A quadrangle shown in FIG. 16 means a measurement space 200.

The horizontal axis of the measurement space 200 is a range, for example 360 degrees, within which the minor 303 rotates in the first direction 60. Therefore, the left vertical axis and the right vertical axis of the measurement space 200 are the same direction in the range finder.

If a range within which the mirror 303 rotates in the first direction 60 is set to 180 degrees, the left vertical axis and the right vertical axis of the measurement space 200 are opposite directions on a circumference around the range finder.

The vertical axis of the measurement space 200 is a range within which the minor 303 rotates in the second direction 70. The mirror 303 exemplarily rotates in the second direction 70 within ±10 degrees from a slope of 45 degrees.

Circles shown in FIG. 16 mean a light pulse. Since the velocity of the light pulse 210 is very fast, it is considered that a direction in which the light pulse 210 is emitted and a direction in which reflected light is incident are substantially the same.

The light pulse 210 is emitted from the lower left side of the measurement space 200 and emitted to the lower right side along an arrow direction, so that scan for one line is performed. Also, while the light pulse 210 moves to the upper direction gradually, scan for one line is performed. For reference, scan sequence for the entire measurement space 200 is displayed using numbers.

Therefore, distance measurement for an object existing in the entire measurement space 200 is performed.

Meanwhile, the light pulse 210 generates distance information. After each light pulse 210 is emitted, a time at which reflected light is measured, so that the distance of an object existing in the direction in which the light pulse 210 is emitted can be measured.

Figure 17:
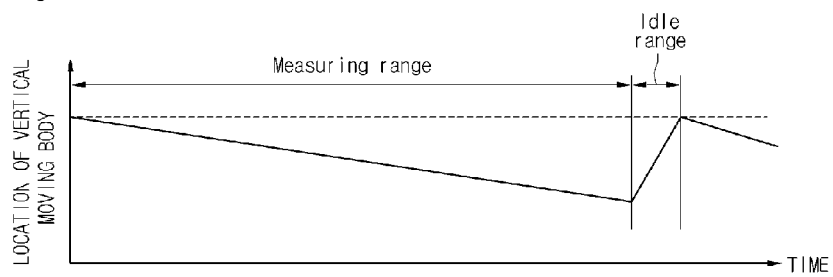
FIGS. 17 and 18 are views explaining a method for finding a range in which a driving method of an actuator has been changed in a different way in a range finder according to an embodiment.
Figure 18:
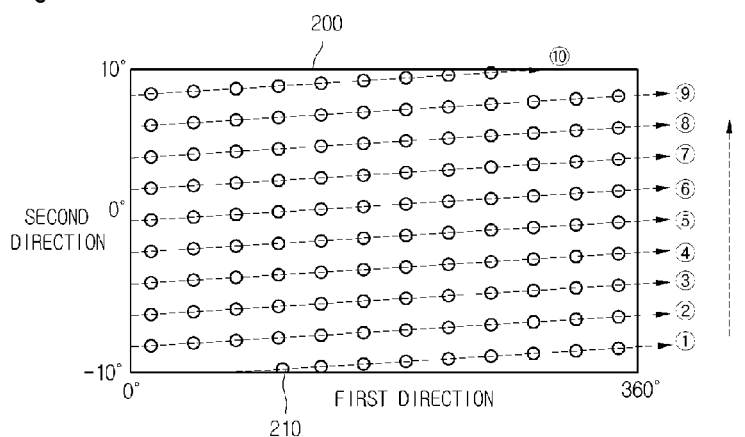

FIGS. 17 and 18 are views explaining a method for finding a range in which a driving method of an actuator has been changed in a different way in a range finder according to an embodiment.

In the method for finding the range according to another embodiment, the mirror 303 is rotated in the first direction 60 and simultaneously rotated in the second direction 70.

That is, the vertical body 320 linearly moves in the lower direction until scan of the measurement space 200 is completed.

Comparison of FIG. 14 with FIG. 17 shows that the method for fining the range exemplified in FIG. 17 can swiftly complete scan of the measurement space 200 because it has a short idle range where distance measurement is not performed in comparison with the method for finding the range exemplified in FIG. 14.

Figure 19:
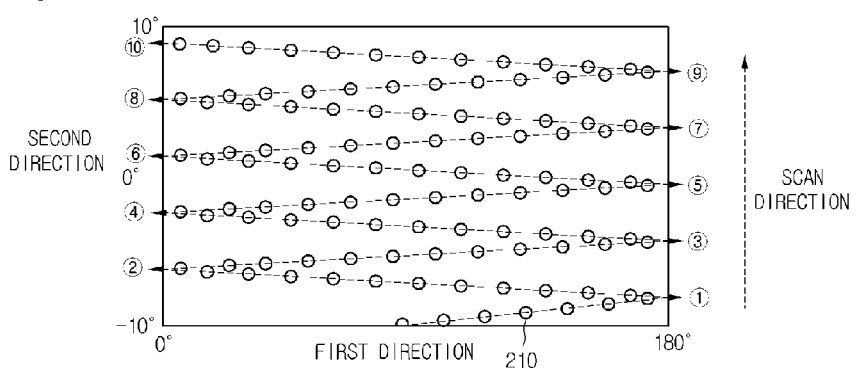
FIG. 19 is a view illustrating a light pulse is emitted to a measurement space in the case where the measurement space is in the range of 0-180 degrees in a first direction in a range finder according to an embodiment.

FIG. 19 is a view illustrating a light pulse 210 is emitted to the measurement space 200 in the case where the measurement space 200 is in the range of 0-180 degrees in the first direction 60 in the range finder according to an embodiment.

Since a range in which the mirror 303 rotates in the first direction 60 is set to 0-180 degrees, the left vertical axis and the right vertical axis of the measurement space 200 are the opposite directions on a circumference around the range finder.

The minor 303 rotates in the first direction 60 and the second direction 70.

Figure 20:
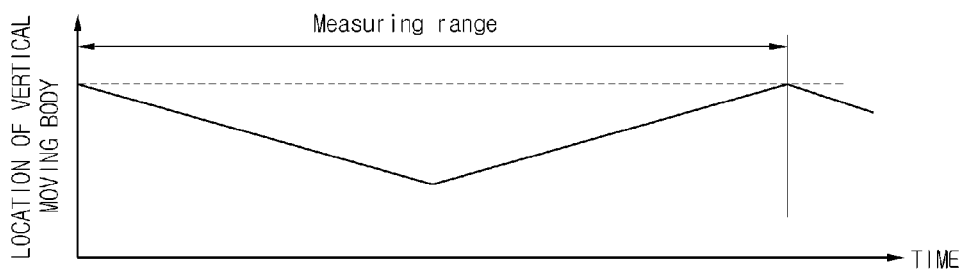
FIGS. 20 and 21 are views explaining a method for finding a range in which a driving method of an actuator has been changed in another different way in a range finder according to an embodiment.
Figure 21:
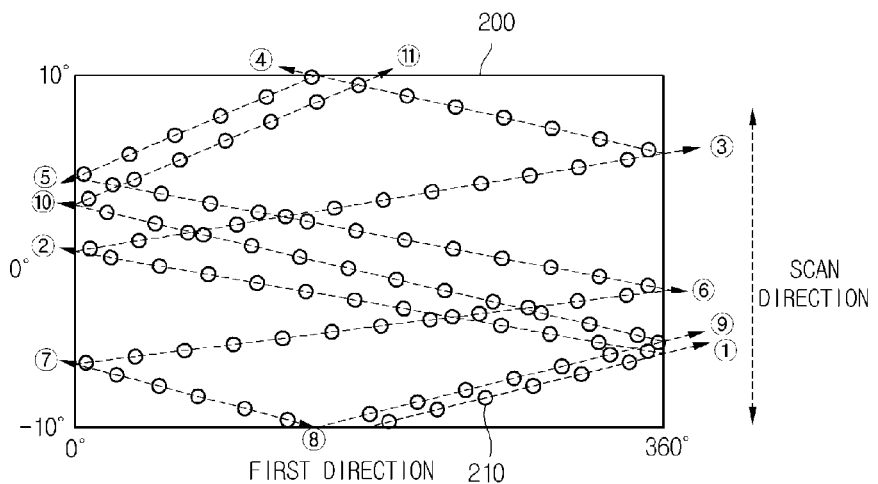

FIGS. 20 and 21 are views explaining a method for finding a range in which a driving method of an actuator has been changed in another different way in a range finder according to an embodiment.

In the method for finding the range according to another embodiment, the mirror 303 is rotated in the first direction 60 and simultaneously rotated in the second direction 70.

That is, the vertical moving body 320 linearly moves in the upper and lower directions.

Comparison of FIG. 14 with FIG. 20 shows that the method for fining the range exemplified in FIG. 20 can swiftly complete scan of the measurement space 200 because it has no idle range where distance measurement is not performed unlike the method for finding the range exemplified in FIG. 14.

Figure 22:
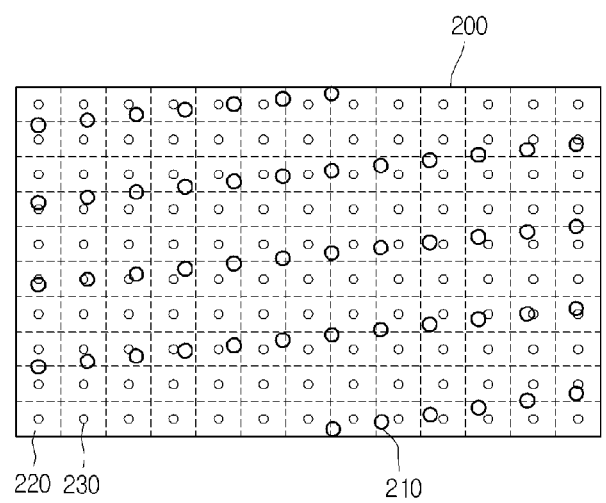
FIG. 22 is a view explaining a method for converting location information measured by a range finder according to an embodiment.

FIG. 22 is a view explaining a method for converting location information measured by a range finder according to an embodiment.

The method for finding the range shown in FIG. 16 can obtain distance information of a uniform location over the entire measurement space 200, and can obtain distance information of locations aligned with a constant interval in the horizontal direction and the vertical direction. Therefore, an external device connected to the interface 15 can easily use location information and distance information.

On the other hand, the method for finding the range shown in FIGS. 18, 19, and 21 cannot obtain distance information of a uniform location over the measurement space 200, or cannot obtain distance information of locations aligned in the horizontal and vertical directions.

Therefore, in the case where the locations of the light pulses 210 emitted to the measurement space 200 are not uniform over the entire measurement space 200, or not aligned in the horizontal and vertical directions, the obtained location information needs to be converted.

Referring to FIG. 22, the entire measurement space 200 is divided into a plurality of small regions 220 having a uniform size.

The plurality of small regions 220 are aligned in the horizontal and vertical directions, and the center of each small region 220 is set as a virtual reference point 230.

If the light pulse 210 is located on one of the plurality of small regions 220, the location information of the light pulse 210 is replaced by the location information of the reference point 230 of the small region 220 on which the light pulse 210 is located. Therefore, the distance information of the light pulse 210 is replaced by the distance information of the reference point 230.

The location information of the light pulse 210 can be replaced by the location information of a most adjacent reference point 230.

As described above, the location information of the light pulse 210 is mapped to new location information that can be easily processed.

If the light pulse 210 is not located on one of the plurality of small regions 220, it is processed that distance information included in the small region 220 where the light pulse 210 does not exist or the light pulse 210 has a distance that cannot be measured.

If a plurality of light pulses 210 are located on one of the plurality of small regions 220, the distance information of a light pulse 210 detected last is replaced by the distance information of a corresponding reference point 230, or the distance information of a close distance is replaced by the distance information of the reference point 230.

Since the reference points 230 are separated with a uniform interval and aligned in the horizontal and vertical directions over the entire measurement space 200, the distance information of the light pulse 210 having been replaced by the distance information of the reference point 230 can be easily used by an external device.

Meanwhile, the sizes of the small regions 220 can be freely designed.

When the small regions 220 are designed too large, distance information in an accurate direction cannot be obtained. When the small regions 220 are designed too small, regions having on distance information increases and much time may be consumed in processing data.

Therefore, the sizes of the small regions 220 can be designed such that the number of the small regions 220 may be similar to the number of the light pulses 210 in the entire measurement space 200.

Conversion of the location information can be processed by the control unit 11 of the controller 10, or not processed by the controller 10 but by an external device connected with the controller 10.

Meanwhile, the above-described range finder can perform distance measurement on an object in the measurement space 200 with varied resolution depending on selection.

For example, more accurate distance measurement of an object in the measurement space 200 can be made by increasing the pulse frequency of the light pulse 210.

The varying of the resolution can be performed under control of the external device connected with the interface 15, or under control of the control unit 11.

The control unit 11 controls the light signal control unit 13 to vary the frequency of the light pulse 210.

Figure 23:
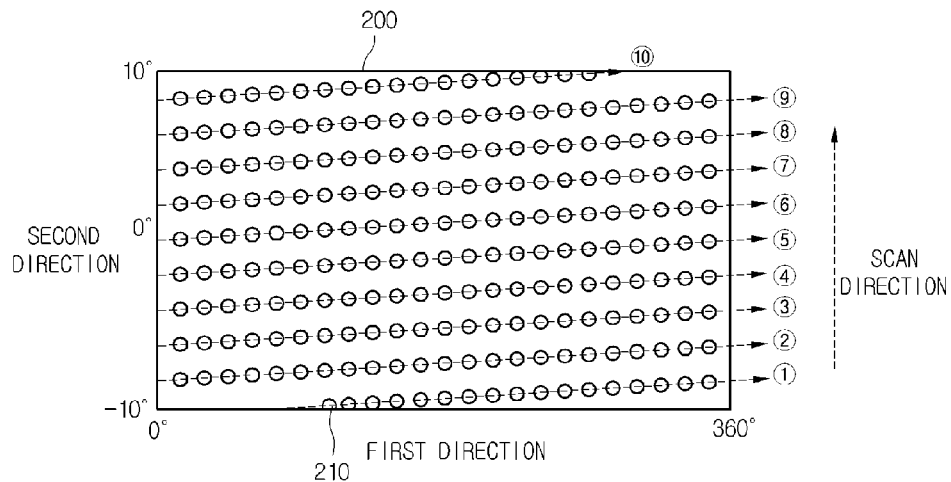
FIG. 23 is a view explaining that resolution has been increased by increasing the frequency of a light pulse at a range finder according to an embodiment.

FIG. 23 is a view explaining that resolution has been increased by increasing the frequency of a light pulse at a range finder according to an embodiment.

Comparison of FIG. 23 with FIG. 18 shows that two times of light pulses 210 are emitted to the same measurement space 200, so that more accurate distance measurement is performed on an object located in the measurement space 200.

Also, the resolution of the horizontal direction can be increased and the resolution of the vertical direction can be decreased even without changing the frequency of the light pulse 210 by decreasing a velocity in which the mirror 303 rotates in the first direction 60.

Figure 24:
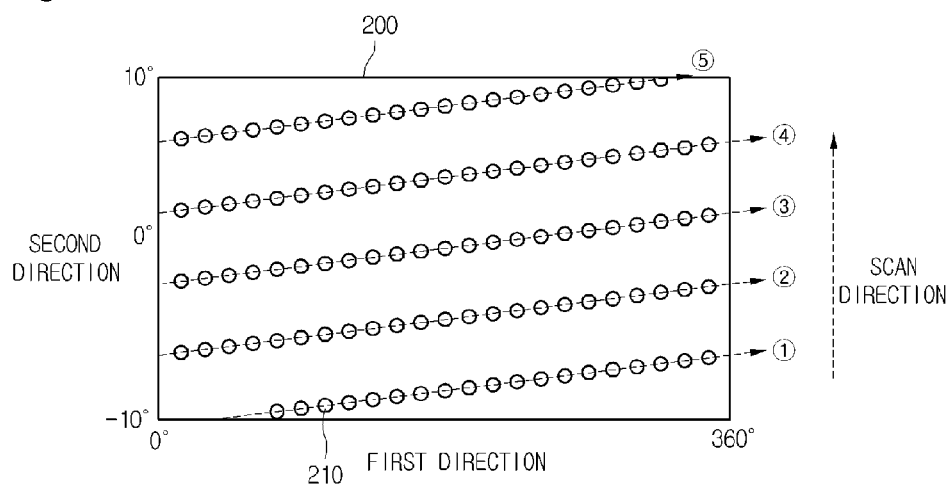
FIG. 24 is a view explaining that the resolution of a horizontal direction and the resolution of a vertical direction are changed by decreasing velocity at which a minor rotates in a first direction in a range finder according to an embodiment.

FIG. 24 is a view explaining that the resolution of a horizontal direction and the resolution of a vertical direction are changed by decreasing velocity at which a minor rotates in a first direction in a range finder according to an embodiment.

Comparison of FIG. 24 with FIG. 18 shows that the frequency of the light pulse 210 does not change but a velocity at which the mirror 303 rotates in the first direction 60 decreases by half, so that the resolution of the horizontal direction increases but the resolution of the vertical direction decreases.

Also, the resolution of the horizontal direction is decreased and the resolution of the vertical direction can be increased even without changing the frequency of the light pulse 210 by increasing a velocity at which the mirror 303 rotates in the first direction 60.

Figure 25:
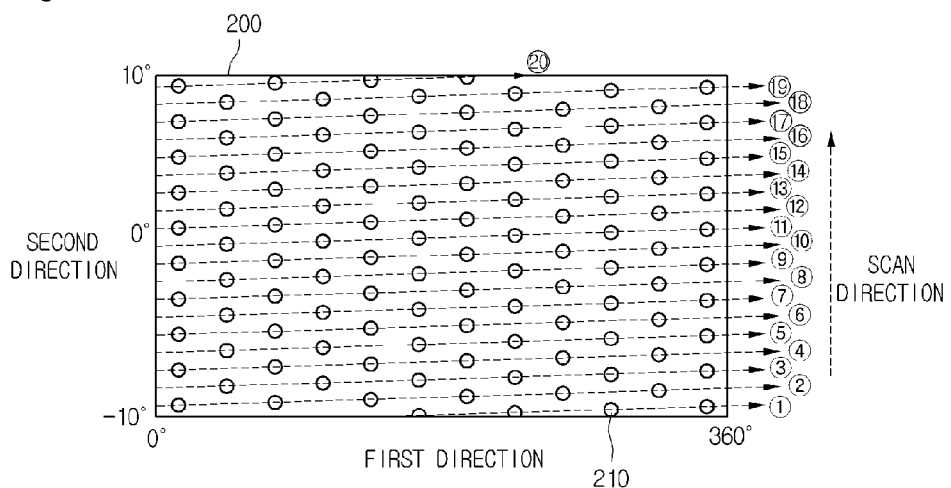
FIG. 25 is a view explaining that the resolution of a horizontal direction and the resolution of a vertical direction are changed by increasing velocity at which a minor rotates in a first direction in a range finder according to an embodiment.

FIG. 25 is a view explaining that the resolution of a horizontal direction and the resolution of a vertical direction are changed by increasing a velocity at which a mirror rotates in a first direction in a range finder according to an embodiment.

Comparison of FIG. 25 with FIG. 18 shows that the frequency of the light pulse 210 does not change but a velocity at which the mirror 303 rotates in the first direction 60 increases by two times, so that the resolution of the horizontal direction decreases but the resolution of the vertical direction increases.

As described above, the range finder according to the embodiment can change resolution by changing the frequency of the light pulse 210, and can change the resolution of the horizontal direction or the vertical direction by changing the rotational velocity of the mirror 303.

Meanwhile, though FIGS. 24 and 25 exemplarily shows changing a velocity at which the minor 303 rotates in the first direction 60, resolution can be changed by changing a velocity at which the mirror 303 rotates in the second direction 70.

The range finder according to the embodiment can operate in the long distance measurement mode and the short distance measurement mode.

The long distance measurement mode can be effectively used for the case where the distance of an object located far away from distances selected in the measurement space 200 needs to be measured. The short distance measurement mode can be effectively used for the case where the distance of an object located within distances selected in the measurement space 200 needs to be measured.

Here, whether a distance is the long distance or the short distance can be selectively determined depending on a product to which the range finder is applied. For example, in a range finder used for self-controlled driving of an automobile, a distance greater than 10 m is regarded as the long distance, and a distance less than 10 m is regarded as the short distance.

In the case where the range finder operates in the long distance measurement mode, the controller 10 decreases a velocity at which the minor 303 rotates in the first direction 60, or decreases a velocity or a range in which the mirror 303 rotates in the second direction 70. Alternatively, the controller 10 can decrease the pulse frequency of the light pulse 210.

For example, the controller 10 can control a range within which the mirror 303 rotates in the second direction 70 in the long distance measurement mode to be ±5 degrees from a slope of 45 degrees.

Since the long distance measurement mode is designed for measuring the distance of an object located at a long distance, distance measurement over a wide range in the vertical direction of the measurement space 200 is not necessarily required, and precise resolution of the vertical direction is not required.

In the case where the range finder operates in the short distance measurement mode, the controller 10 increases a velocity at which the minor 303 rotates in the first direction 60, or increases a velocity or a range in which the mirror 303 rotates in the second direction 70. Alternatively, the controller 10 can increase the pulse frequency of the light pulse 210.

For example, the controller 10 can control a range within which the mirror 303 rotates in the second direction 70 in the short distance measurement mode to be ±15 degrees from a slope of 45 degrees.

The short distance measurement mode is designed for measuring the distance of an object located at a close distance, distance measurement over a wide range in the vertical direction of the measurement space 200 is required, and precise resolution of the vertical direction is required.

The range finder according to the embodiment varies the pulse frequency of the light pulse 210 or a velocity or a range in which the mirror 303 rotates in the first direction 60 or the second direction 70 depending on a measurement mode to perform distance measurement for the measurement space 200.

Figure 26:
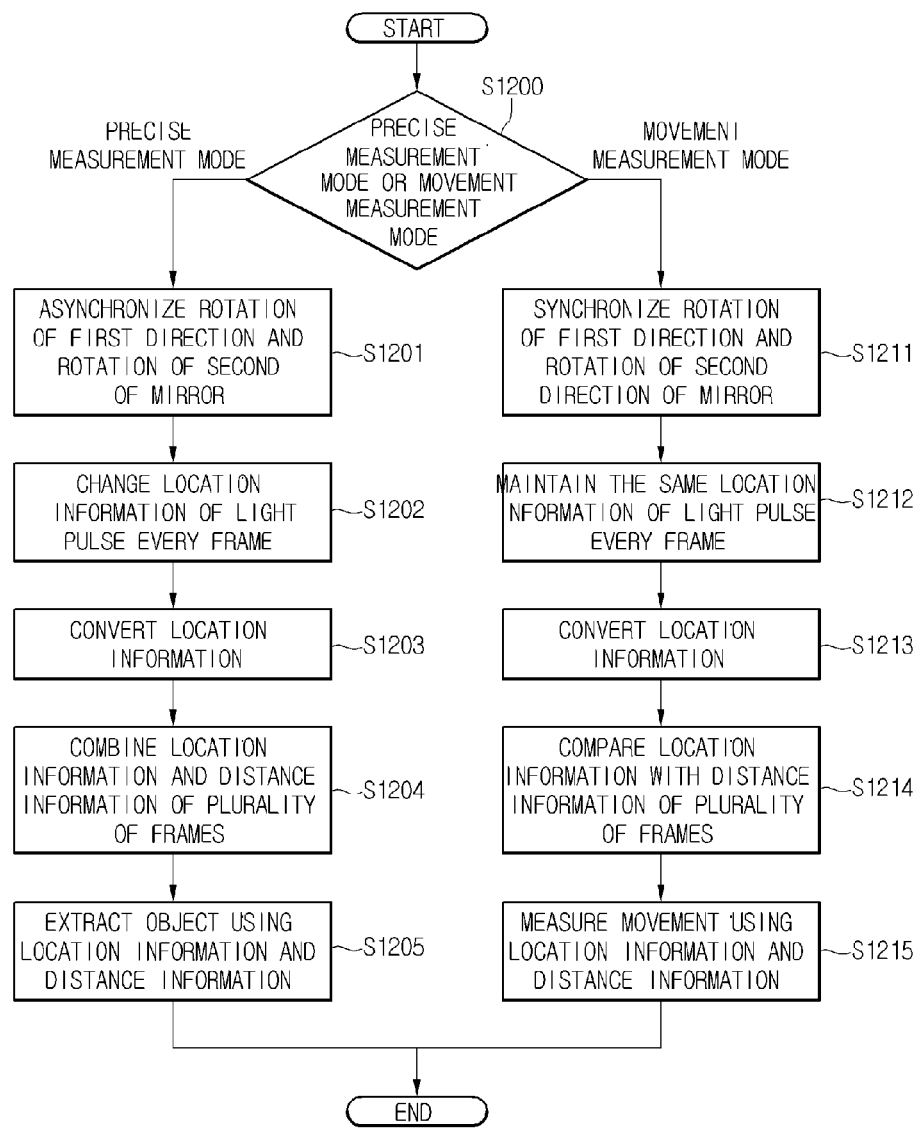
FIG. 26 is a view explaining the operation of a range finder according to an embodiment.

FIG. 26 is a view explaining the operation of the range finder according to an embodiment.

The range finder according to the embodiment can operate in a precise measurement mode and the movement measurement mode (S1200).

The precise measurement mode is described. The precise measurement mode can realize a function of extracting an object through information such as the shape, the arrangement, and the distance of the object located in a measurement space 200.

In the precise measurement mode, rotating the minor 303 in the first direction 60 and rotating the mirror 303 in the second direction 70 are asynchronized (S1201).

That is, a position from which the light pulse 210 is emitted is changed every frame.

For example, in case of obtaining location information and distance information of one frame for one second, the range finder according to the embodiment allows the mirror 303 to rotate in the first direction 60 by 360 degrees at a frequency of 3 Hz, and to rotate in the second direction 70 by +15 degrees and then by −15 degrees at a frequency of 3.1 Hz.

In this case, the first direction 60 of the mirror 303 is the same but the second direction 70 of the mirror 303 changes at a start point of each frame.

Therefore, location information regarding the emission of the light pulse 210 changes every frame (S1202).

Figure 27:
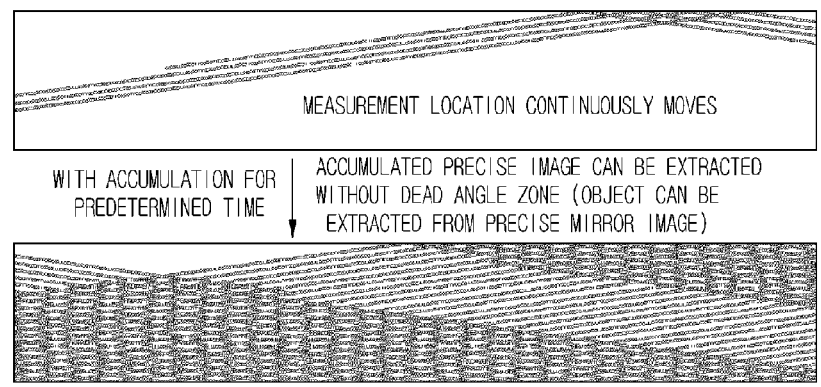
FIG. 27 is a view explaining a scanning process of a light pulse and a combination of light pulses in a plurality of frames in the case where a range finder according to an embodiment operates in a precise measurement mode.

FIG. 27 is a view explaining a scanning process of a light pulse and a combination of light pulses in a plurality of frames in the case where a range finder according to an embodiment operates in a precise measurement mode.

That is, when rotating the minor 303 in the first direction 60 and rotating the mirror 303 in the second direction 70 are asynchronized, and location information and distance information of a plurality of frames are combined, light pulses 210 can be emitted without the dead angle area of the measurement space 200 as illustrated in FIG. 27 (S1204).

Therefore, light pulses 210 can be emitted densely to the measurement space 200, and the precise distance information of a fine region or a partial location of an object located in the measurement space 200 can be obtained.

Meanwhile, as illustrated in FIG. 22, the location information can be converted into new location information that is easy to process (S1203).

Also, a sequence of the process S1204 of combining the location information and the distance information of a plurality of frames, and the process S1203 of converting location information into new location information can change.

Next, an object located in the measurement space 200 is extracted using combined information of the location information and the distance information of the plurality of frames (S1205).

The range finder according to the embodiment can obtain distance information of very high resolution by combining the location information and the distance information of the plurality of frames. Therefore, the shapes, the arrangement, and the distances of objects located in the measurement space 200 can be identified.

For example, when distance information of a first point and a second point having adjacent location information in the measurement space 200 has a great difference, the first point and the second point can be portions of different objects.

Also, when a plurality of points having adjacent location information have the same distance information, or constant change in distance information, the plurality of points can be a portion of one object.

That is, the control unit 11 can identify an object existing in the measurement space 200 using location information in the measurement space 200 and change in distance information according to changed in the location information.

Figure 28:
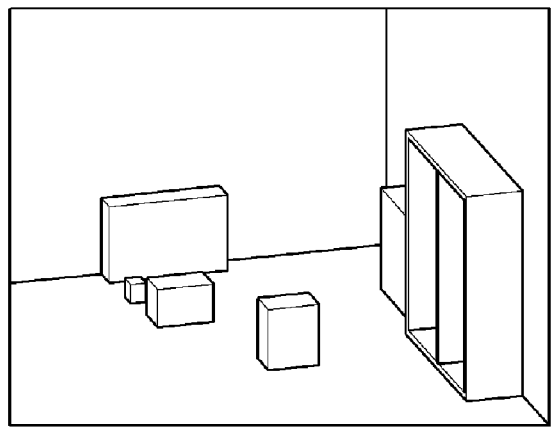
FIG. 28 is a view explaining that an object located in a measurement space has been extracted through a precise measurement mode.

FIG. 28 illustrates that an object located in a measurement space 200 has been extracted through a precise measurement mode.

As illustrated in FIG. 28, objects located in the measurement space 200 can be identified through the precise measurement mode.

Also, the range finder according to the embodiment can operate in a movement measurement mode (S1200).

The movement measurement mode is described. The movement measurement mode can realize a function of extracting the relative movement and velocity of an object located in the measurement space 200. That is, in the case where an object in the measurement space 200 moves or the range finder moves, the relative movement of the object with respect to the range finder can be extracted.

In the movement measurement mode, rotating the mirror 303 in the first direction 60 and rotating the mirror 303 in the second direction 70 are synchronized (S1211).

That is, a position from which the light pulse 210 is emitted is made to be the same every frame.

For example, in the case where the range finder according to the embodiment obtains the location information and the distance information of one frame for one second, the mirror 303 can be made to rotate by 360 degrees in the first direction at a frequency of 3 Hz and to rotate by +15 degrees and then by −15 degrees in the second direction 70 at a frequency of 3 Hz.

In this case, the first direction 60 and the second direction 70 in which the mirror 303 rotates become the same at a start point of each frame.

Therefore, location information regarding emission of the light pulse becomes the same every frame (S1212).

Figure 29:
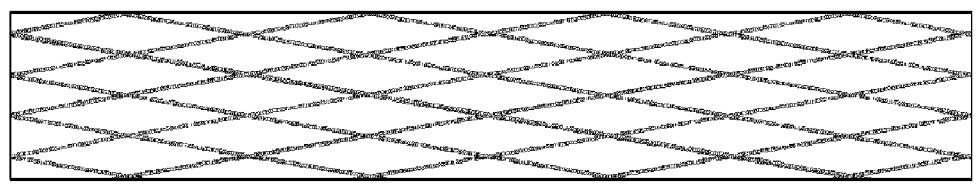
FIG. 29 is a view explaining a scanning process of a light pulse and a combination of light pulses in a plurality of frames in the case where a range finder according to an embodiment operates in a movement measurement mode.
Figure 29:

FIG. 29 illustrates that a scanning process of a light pulse and a combination of light pulses in a plurality of frames in the case where a range finder according to an embodiment operates in the movement measurement mode.

That is, when rotating the minor 303 in the first direction 60 and rotating the mirror 303 in the second direction 70 are synchronized, and location information and distance information of a plurality of frames are combined, light pulses 210 can be emitted to the same location of the measurement space 200 (S1212).

Therefore, the light pulses 210 can be emitted with a constant interval to a predetermined location of the measurement space 200, and location information and distance information of a plurality of frames can be compared for each frame, so that the movement and velocity of an object located in the measurement space 200 can be extracted (S1214).

Meanwhile, as described in FIG. 22, the location information can be converted into new location information easy to process (S1213).

Also, a sequence of the process S1214 of comparing the location information with the distance information of a plurality of frames, and the process S1213 of converting location information into new location information can change.

Next, the movement or velocity of an object located in the measurement space 200 are extracted using information of comparing the location information with the distance information of the plurality of frames (S1215).

That is, the control unit 11 compares the location information with the distance information of the plurality of frames stored in the memory 14 for each frame to extract the movement and the velocity of an object located in the measurement space 200.

For example, in the case where distance information of adjacent first to fourth points in the measurement space 200 has been measured as 10 m in a first frame, distance information of adjacent first to sixth points in the measurement space 200 has been measured as 9 m in a second frame, distance information of adjacent first to eighth points in the measurement space 200 has been measured as 8 m in a third frame, it can be judged that an object located at the first to fourth points in the first frame gradually moves to a relatively close location.

Also, the moving velocity of the object can be extracted using a measurement time difference between the first frame and the third frame, and the moving distance of the object.

The control unit 11 transmits the location information and the distance information of the plurality of frames stored in the memory 14 under control of an external device to allow the external device can extract the identification, the movement, and the velocity of an object located in the measurement space 200.

Also, the control unit 11 can extract the identification, the movement, and the velocity of an object located in the measurement space 200 using the location information and the distance information of the plurality of frames stored in the memory 14 under control of the external device.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts within the scope of the disclosure, the drawings and the appended claims.

INDUSTRIAL APPLICABILITY

The range finder according to an embodiment can be applied to various industrial fields using space recognition or movement measurement that uses distance measurement such as a robot, an automobile, and a security device.

The invention claimed is:

1. A method for finding a range, the method comprising:
    emitting a light pulse to a measurement space and detecting reflected incident light reflected by an object to obtain location information and distance information of the object;
    varying a direction in which the light pulse is emitted to obtain location information and distance information of the object;
    inputting an operating mode;
    varying at least one of a frequency of the light pulse, a displacement velocity in the direction in which the light pulse is emitted, and a displacement range in the direction in which the light pulse is emitted depending on the operating mode to obtain location information and distance information of the object;
    performing at least one of decreasing a displacement velocity in a horizontal direction parallel to the direction in which the light pulse is emitted, decreasing a displacement velocity or a displacement range in a vertical direction perpendicular to the direction in which the light pulse is emitted, and decreasing a pulse frequency of the light pulse when the operating mode is a long distance measurement mode; and
    performing at least one of increasing a displacement velocity in a horizontal direction parallel to the direction in which the light pulse is emitted, increasing a displacement velocity or a displacement range in a vertical direction perpendicular to the direction in which the light pulse is emitted, and increasing a pulse frequency of the light pulse when the operating mode is a short distance measurement mode.

2. The method according to claim 1, comprising emitting the light pulse to a direction moved to at least one of a first direction and a second direction perpendicular to the first direction to obtain the location information and the distance information of the object.

3. The method according to claim 2, wherein the light pulse moves to one of the first and second directions and then moves to the other direction.

4. The method according to claim 2, wherein the light pulse simultaneously moves to both the first direction and the second direction.

5. The method according to claim 1, wherein a direction in which the light pulse is emitted by a reflection mirror is varied.

6. The method according to claim 1, wherein the location information and the distance information are stored by the frame.

7. The method according to claim 6, comprising obtaining and storing the location information and the distance information for a plurality of frames, and combining the location information and the distance information of the plurality of frames to calculate new location information and new distance information.

8. The method according to claim 7, comprising comparing the location information and the distance information of the plurality of frames to calculate a movement or a moving velocity of an object located in the measurement space.

9. The method according to claim 1, comprising:
  inputting an operating mode; and
  changing the direction in which the light pulse is emitted every frame when the operating mode is a precise measurement mode; and
  maintaining the same direction in which the light pulse is emitted every frame when the operating mode is a movement measurement mode.

* * * * *